Jan. 24, 1933.  R. H. TOWNSEND  1,895,178
ARRANGEMENT FOR PRODUCING PHONOGRAPH RECORDS
Filed Dec. 29, 1924   2 Sheets-Sheet 1
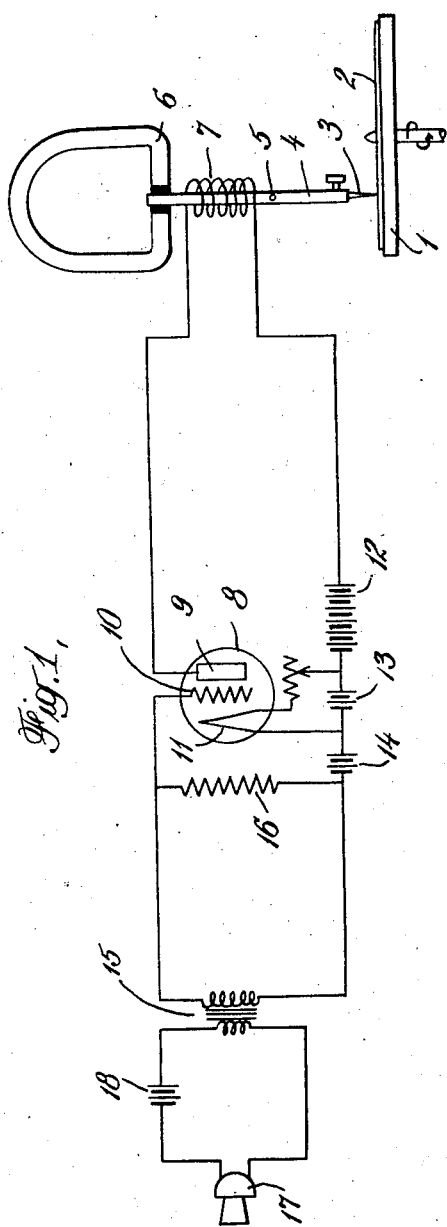
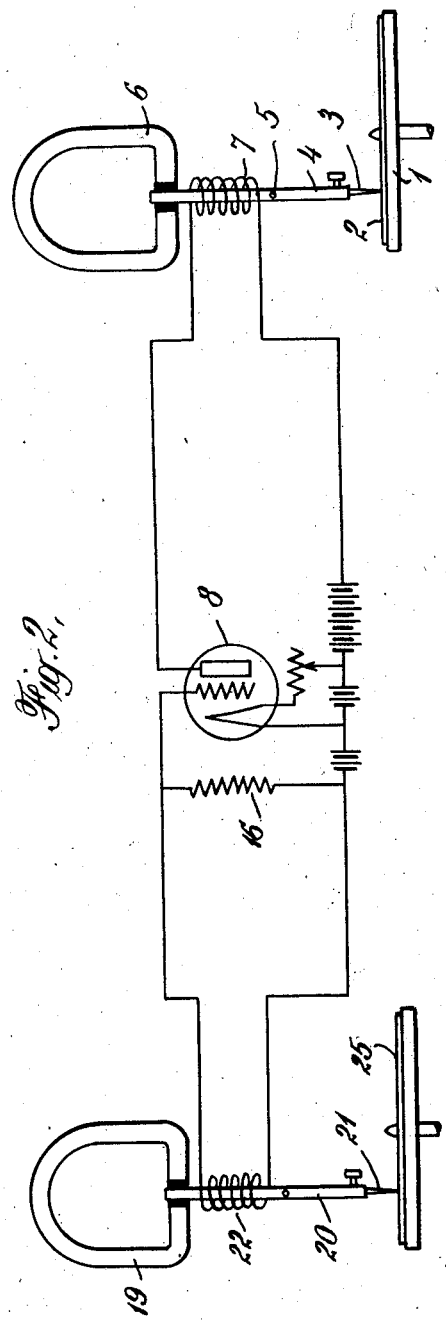
INVENTOR
R. H. Townsend
BY
ATTORNEYS Jan. 24, 1933.     R. H. TOWNSEND     1,895,178
ARRANGEMENT FOR PRODUCING PHONOGRAPH RECORDS
Filed Dec. 29, 1924     2 Sheets-Sheet 2
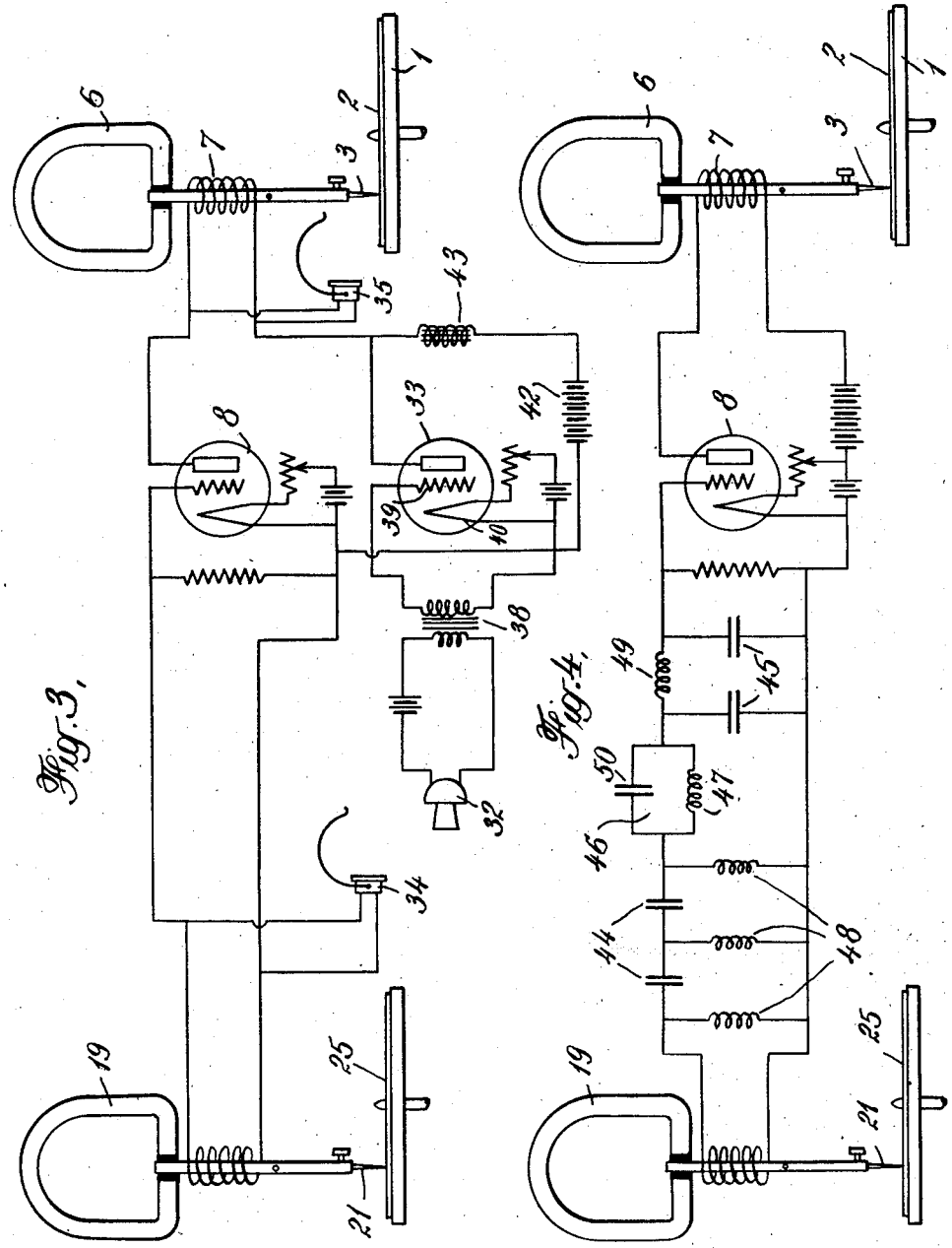
INVENTOR
R. H. Townsend
BY
ATTORNEYS.

Patented Jan. 24, 1933

1,895,178

UNITED STATES PATENT OFFICE

RALPH H. TOWNSEND, OF MOUNT VERNON, NEW YORK, ASSIGNOR, BY MESNE ASSIGNMENTS, TO UNITED RESEARCH CORPORATION, OF LONG ISLAND CITY, NEW YORK, A CORPORATION OF DELAWARE

ARRANGEMENT FOR PRODUCING PHONOGRAPH RECORDS

Application filed December 29, 1924. Serial No. 758,603.

This invention relates to the art of sound recording and has reference more particularly to the production of phonographic sound records.

The invention involves the use of some suitable means for causing the sound to be recorded to develop in a circuit an electric current which fluctuates in exact accordance with the amplitude of the sound waves, then amplifying the fluctuating current thus produced by means of a vacuum tube amplifier, and then utilizing the current so produced and amplified to actuate a recorder for impressing on a suitable record substance a sound record undulating in exact correspondence with the fluctuation of the actuating current. The means employed for causing the sound to be recorded to develop a fluctuating electric current may take various forms, all of which may be designated generally as pick-ups; for instance the microphone detector commonly used as a pick-up in radio broadcasting may be employed.

This procedure in the recording of sound offers numerous pronounced advantages. For instance, sounds at a distant source can be recorded by broadcasting them by means of radio telephone apparatus and employing the pick-up at the recording station to develop the fluctuating electric current employed as above set forth.

Again, famous artists perform much better under the inspiration of a large auditorium, a large appreciative audience, appropriate scenery and stage lighting than under the conditions prevailing in the usual sound recording laboratory and the method herein described may be employed for producing better sound records by the employment of the pick-up in the auditorium, receiving the sounds thus produced under the best auspices and transmitting them electrically to the input side of an amplifier, the output side of which is connected to the sound recording apparatus at a laboratory properly equipped for that work.

Also, the procedure above outlined permits of recording the speeches of political leaders and statesmen who could not be induced to speak in sound recording laboratories or could not speak there as they would in addressing a large and responsive audience.

Further, this procedure in making sound records results in the production of more perfect records from which a much more faithful reproduction of the original sounds may be obtained because in accordance with the practice heretofore employed of receiving the sounds to be recorded in a horn connected with a box containing the diaphragm of the recorder, considerable distortion of the sound waves occurs in the horn even though its design be as nearly ideal as possible.

The procedure above outlined may also be employed using a different form of pick-up for developing the fluctuating electric current in the circuit leading to the input side of the amplifier. Instead of such a pick-up as is employed in radio telephone broadcasting, I may employ a pick-up in which a sound record is adapted to actuate devices which develop the desired fluctuating electric current. For instance, a sound record may be arranged to vibrate a stylus within a coil located within a magnetic field and the coil may be connected in a circuit leading to the input side of the amplifier. With such an arrangement the current in this circuit will fluctuate in direct correspondence with movements of the stylus actuated by the record groove.

Such an arrangement may be employed for various purposes. For instance, a sound record having a "hill and dale" groove may actuate the magnetic pick-up and the resultant current fluctuations may be employed for cutting a laterally undulating sound record. Also, a cylinder record may be employed for actuating the pick-up and the recorder operated thereby may make a master for a disc sound record. Again, a record having a spiral groove of a pitch of 90 threads per inch may be employed to actuate the pick-up and the recorder operated thereby may be arranged to make a master having a groove whose pitch is 200 threads per inch. Again, two records each requiring three and one-half minutes for the rendition of the sound record thereon may be combined by the use of this apparatus into a single record which would require seven minutes to play.

Again, a record having a low volume may be used to actuate the magnetic pick-up and the resultant fluctuations of current may be employed in the production of a record having much greater or much less volume. Also, it is possible by the use of the apparatus above outlined to actuate the pick-up by a phonograph record which has in it undesirable frequencies and produce a record in which those frequencies are absent. This may be done by introducing into the amplifier circuit a wave trap arranged to eliminate a band of frequencies including the undesirable ones.

The present invention relates particularly to the general procedure above outlined for combining, upon a single sound record, sounds emanating from two or more sources, the combining of the sounds from the different sources being effected electrically rather than acoustically. This results in the production of much more perfect records. For instance, a sound record may be employed to actuate a magnetic pick-up and thus develop a fluctuating current in the circuit leading to the amplifier and a sound from another source, as for instance an instrumental accompaniment for a vocal selection, may be picked up by a microphone detector whose circuit is connected to the circuit leading to the amplifier or from the amplifier to the recorder, the result being that the operating member of the recorder is actuated by the combined effects of the sound record and the sound emanating from the separate source.

I have illustrated diagrammatically in the drawings annexed hereto arrangements which may be employed in practicing the invention in accordance with the procedure above set forth.

In these drawings Fig. 1 shows an arrangement employing a pick-up of the general type of those employed in radio telephone broadcasting; Fig. 2 is a similar view except that the pick-up is one actuated by a sound record; Fig. 3 is a similar view of an arrangement which may be employed in picking up sounds from two different sources and combining them for the purpose of obtaining a composite record of the combined sounds according to the present invention, and Fig. 4 is a view similar to Fig. 2 with a filter included in the circuit to prevent the transfer of defects from the record used to actuate the pick-up to the record being made.

Referring to Fig. 1, 1 is a turntable on which is mounted a record blank 2. A recording stylus 3 of the type ordinarily employed for cutting sound wave undulations in master records is secured in a stylus bar 4 pivoted at 5 and functioning as the armature of a polarized electro-magnetic device comprising a permanent magnet 6 and a winding 7 through which the stylus bar extends and in which it is free to move laterally about the pivot 5. Current flowing through coil 7 causes the stylus bar to become magnetized and thus to be attracted to one pole or the other of the permanent magnet 6. The coil 7 is in the plate circuit of a three-electrode vacuum tube 8 which comprises a plate or anode 9, a grid 10 and a filament 11. A plate battery 12 is provided for energizing the plate circuit; a filament battery 13 is provided for heating the filament 11; and a battery 14 is inserted in the filament grid circuit to provide a negative bias on the grid 10, though this latter battery may be omitted if desired.

The input or grid-filament circuit of the tube includes a secondary winding of a transformer 15 and preferably a high resistance 16 shunted across the terminals of the secondary winding of the transformer. The primary winding of the transformer 15 is included in circuit with a microphone 17 and a battery 18. The microphone or pick-up 17 may be placed wherever is necessary to receive the sounds to be recorded. It may be positioned to receive sounds broadcast by radio or it may be placed within an auditorium where distinguished statesmen are to appear or famous artists are to perform. Music or speech to be recorded is impressed upon the microphone 17 and current fluctuations corresponding to the sound are set up in the microphone circuit. The voltage thereby developed across the terminals of the secondary winding of the transformer 15 is impressed upon the input electrodes, that is, the grid and filament of the vacuum tube amplifier, and corresponding amplified current fluctuations are set up in the plate circuit of the amplifier. These current fluctuations traverse the coil 7 causing fluctuating magnetization of the stylus bar 4 and as the intensity of magnetization at the end of the stylus bar disposed between the poles of the permanent magnet 6 changes, its relative attraction toward one pole or the other changes accordingly, with the result that an undulating record groove is cut in the record 2.

Owing to the fact that there is a continuous flow of current in the plate circuit of the vacuum tube amplifier whenever the filament 11 is lighted, the stylus bar 4 is normally magnetized and it is therefore normally attracted toward one pole of the permanent magnet 6. This should be compensated for by applying some yielding pressure to the stylus bar 4 tending to hold it always midway between the permanent magnet and at the same time permitting it to move toward one pole or the other in response to a fluctuation of the plate circuit.

The arrangement illustrated in Fig. 2 is intended for producing new master records utilizing existing records for producing the sound waves which are to be recorded on the new masters. This arrangement is of particular advantage where an existing record is low in volume and it is desired to reproduce it on an amplified scale. It sometimes happens that a record made of a public address or musical rendition turns out to be low in volume and it is impossible to secure a reperformance so that another record may be made. The advantage of being able to duplicate, on an amplified scale, master records of this character is apparent.

In Fig. 2, the apparatus and circuit connections at the right, including the amplifier and recorder, are identical with those shown in Fig. 1. Instead of the transformer 15, microphone 17 and battery 18 of Fig. 1, there is substituted a different form of electro-magnetic pick-up comprising a permanent magnet 19, a combined armature and stylus bar 20 carrying a phonograph needle or stylus 21 and a coil 22. This functions as an electric generator and is operable in response to vibratory motion imparted to the stylus bar to generate corresponding fluctuating current.

When the record disc 25, with which the stylus 21 is in contact, is rotated, the stylus and stylus bar are vibrated in accordance with the undulations on the record, and as a result, the magnetic flux in the stylus bar varies in accordance with the undulations on the record and a correspondingly varying potential is set up across the terminals of coil 22. This varying potential corresponds in character with the varying potential set up across the terminals of the secondary winding of transformer 15 in Fig. 1 and is likewise reproduced in amplified form in the output circuit of the vacuum tube amplifier.

The coil forming a part of an electro-magnetic recording stylus actuating device is included in the output or plate circuit of the vacuum tube. This coil is varyingly energized in accordance with the fluctuating current in the plate circuit in which it is included and actuates the stylus bar as in the arrangement of Fig. 1.

The arrangement of Fig. 2 may also be employed to good advantage for transferring to a large disc music or the like which has previously been recorded on two or more small discs or vice versa.

For the purpose of combining on a new master record the music recorded on an existing record together with some additional music or vocal selection, the arrangement of Fig. 3 is provided, and the invention relates particularly thereto. This arrangement corresponds with that of Fig. 2 in that it is designed to transfer the sound wave undulations of an existing record to a new master record but in addition there are provided a microphone 32 with its associated circuit connections, a supplemental amplifier tube 33 and telephone receivers 34 and 35. Sound wave undulations on the existing disc 25 are transferred to the new master record 2 in amplified form in the manner previously described.

The musician or orator, as the case may be, who is to supply the supplemental music or speech, listens through telephone receiver 34 or 35 to the sounds from the disc 25. If he listens through receiver 34 he will hear only the music coming from the disc 25, but if he listens through receiver 35 he will hear, in addition, the music or speech which he himself is producing.

The supplemental music or speech impressed upon microphone 32 is, in turn, impressed in the form of potential variations across the terminals of the primary winding of transformer 38 and the terminals of the secondary thereof are connected to the grid 39 and filament 40 of the supplemental amplifier tube 33. It will be noted that the plate filament circuit of the two amplifier tubes 33 and 8 are connected in parallel and supplied with current from a battery 42. A coil 43 of high inductance is inserted in series with the battery 42 and functions to maintain the current from this battery at a constant value. The sum of the currents in the plate circuits of the two vacuum tubes 33 and 8 being a constant value, any variation of potential on the grid of one tube causes a variation of current in the plate circuit of both tubes. With such an arrangement, the volumes of tone impressed upon the new composite master record from each of the two sources may easily be monitored and maintained in proper proportion.

An arrangement designed to preclude the transfer of certain frequencies corresponding to defects in records used as originating sources is shown in Fig. 4. This arrangement corresponds with that of Fig. 2 except that it includes a wave filter comprising inductances 48 and 49, condensers 44 and 45 and a wave trap 46 consisting of an inductance 47 and condenser 50 in parallel. The wave trap 46 is preferably tuned to the frequency of the most pronounced noises on the record disc. That portion of the filter comprising inductance 49 and condenser 44 is designed to by-pass low frequency noises, while that portion of the filter comprising inductance coil 48 and condensers 45 is designed to by-pass high frequency noises. Generally the filter employed must be designed or adjusted with a view to filtering out the particular frequencies of the noises present on the particular record which it is intended to use. These frequencies can be determined in advance by means of an oscillograph and when determined the filter can be readily designed to exclude them. In some cases it may be necessary or desirable to use several filters, each being switched into circuit at the critical moment when the stylus is about to come into contact with that portion of the record where the defect corresponding to the frequency which that particular filter is designed to obstruct is located.

It will be realized that the several features of the invention are capable of many different combinations with each other and that the invention is susceptible of extensive modifications with respect to the construction and arrangement of the parts of the apparatus employed.

I claim:

1. In a system for recording sound waves, means for electrically transmitting and amplifying sound wave undulations from an existing phonograph record to a record blank, and electrical means in circuit with said means for simultaneously impressing supplementary and amplified sound wave undulations on said record blank.

2. The method of making a phonograph record which consists in utilizing an existing phonograph record as an actuator for an electrical generator to produce electrical energy varying in accordance with the sound waves recorded on said existing record and for amplifying said waves, producing supplemental varying electrical energy in accordance with supplemental sound waves, synchronizing said first mentioned electrical energy with said supplemental electrical energy, and energizing an electro-magnetic cutter actuating device by means of said first mentioned electrical energy and said supplemental electrical energy simultaneously.

3. The method of making a phonograph record which consists in transferring the music, speech or the like recorded on an existing record to a record blank and recording and amplifying supplemental sound waves on the same record blank in superposition to the sound wave record transferred and amplified from the said existing record.

4. A phonographic recording system comprising a pair of rotatable tables, a phonograph record mounted on one of the tables and rotatable therewith, a record blank mounted on the other table and rotatable therewith, a stylus engaging the record groove of the phonograph record, means operable in response to vibrations imparted to the stylus to produce fluctuating electrical energy corresponding to said vibrations, a recording stylus engaging the record blank, an electrical actuating device for the recording stylus, circuit connections for impressing said fluctuating electrical energy on said device, a vacuum tube amplifier included in said circuit connections, a microphone pick-up electrically connected with said actuating device whereby sound waves other than those recorded on the phonograph record may be impressed on the record blank, and a telephone receiver included in the circuit connections and arranged to reproduce the sound waves recorded on the phonograph record synchronously with the transference thereof to the record blank.

5. A phonographic recording system comprising a pair of rotatable tables, a phonograph record mounted on one of the tables and rotatable therewith, a record blank mounted on the other table and rotatable therewith, a stylus engaging the sound groove of the phonograph record, means operable in response to vibrations imparted to the stylus to produce fluctuating electrical energy corresponding to said vibrations, a recording stylus engaging the record blank, an electrical actuating device for the recording stylus, circuit connections for impressing said fluctuating electrical energy on said device, a vacuum tube amplifier included in said circuit connections, a microphone pick-up electrically connected with said actuating device whereby sound waves other than those recorded on the phonograph record may be impressed on the record blank, and a telephone receiver included in the circuit connections and interposed between the reproducing stylus and said vacuum tube amplifier for reproducing the sound waves from the original phonograph record without blending them with the waves transmitted through said microphone pick-up.

6. A phonographic recording system comprising a pair of rotatable tables, a phonograph record mounted on one of the tables and rotatable therewith, a record blank mounted on the other table and rotatable therewith, a stylus engaging the record groove of the phonograph record, means operable in response to vibrations imparted to the stylus to produce fluctuating electrical energy corresponding to said vibrations, a recording stylus engaging the record blank, an electrical actuating device for the recording stylus, circuit connections for impressing said fluctuating electrical energy on said device, a vacuum tube amplifier included in said circuit connections, a microphone pick-up electrically connected with said actuating device whereby sound waves other than those recorded on the phonograph record may be impressed on the record blank, a telephone receiver included in the circuit connections and interposed between the reproducing stylus and said vacuum tube amplifier for reproducing the sound waves recorded on the phonograph record and a telephone receiver included in the circuit connections and interposed between said vacuum tube amplifier and said recording stylus for reproducing the sound waves recorded on the phonograph record synchronously with the sound waves transmitted through said microphone pick-up.

7. The method of making a composite sound record which comprises transferring the music, speech or the like of an existing sound record to a new record, simultaneously recording supplemental sound waves on the new record with the sound waves transferred from the said existing record, and maintaining in a desired proportion the volumes of tone from each of the two sources.

8. The method of making a sound record which comprises transferring the sound waves recorded on an existing record to a new record, amplifying and recording supplemental sound waves on the new record in superposition to the sound wave record transferred from the said existing record, monitoring the sound waves being recorded, and maintaining the volumes of tone of each of said sound waves in a desired proportion.

9. In a system for electrically recording sound waves derived from both an existing sound record and from sound supplemental thereto produced in timed relation or synchronous therewith, the combination of means for recording on a new record electrical currents derived from the existing sound record, and electrical means in circuit with said first means for simultaneously recording supplemental and amplified electrical currents on said new record corresponding to said supplemental sound waves.

10. A system for recording sound waves comprising a sound record, an electrical pickup for translating said sound record into an electrical current, an amplifier, connections for supplying said current to said amplifier, a sound recorder, a circuit for connecting said amplifier to said recorder, means for translating supplemental sound wave undulations into an electrical current, a circuit for said last-mentioned means, connections between said last-mentioned circuit and said recorder whereby said recorder is simultaneously energized by said first-mentioned current and by said second-mentioned current, and means for maintaining in a desired proper proportion the electrical recording currents derived from each of the two sources.

In testimony whereof I affix my signature.

RALPH H. TOWNSEND.